Jan. 7, 1969  H. STOFFER ET AL  3,419,927
SELF-RELEASING MARKER BUOY
Filed Oct. 2, 1967

INVENTORS
HOMER STOFFER
PAUL R. GRACE

3,419,927
SELF-RELEASING MARKER BUOY
Homer Stoffer, 338 Ray St., Newcomerstown, Ohio
43832, and Paul R. Grace, 524 4th St., Dennison,
Ohio 44621
Filed Oct. 2, 1967, Ser. No. 672,313
U.S. Cl. 9—9                                                    5 Claims
Int. Cl. B63b *21/52*

ABSTRACT OF THE DISCLOSURE

Our self-releasing marker buoy provides means of marking for retrieval the location of nonfloating objects in jeopardy of being lost overboard from vessels or watercraft or the like. Two hemispheres are held together by a magnet. The hemispheres separate when immersed in the water and alone between them mark a sunken objects.

Summary of the invention

Our buoy employs first and second engageable hollow hemispheres, at least one of which floats in water. At least one of the hemispheres has holes therein. Cable means is disposed within one hemisphere and is secured to the other. Means disposed within the hemispheres magnetically couples same together. One hemisphere is secured by suitable means to a nonfloating object.

When the nonfloating object sinks in water, water enters the coupled hemispheres through the holes and as the object continues to sink, the buoyancy of the float hemisphere overcomes the magnetic coupling effect and the float hemisphere rises to the surface of the water. The other hemisphere remains connected to the object and the cable means interconnects the two hemispheres. As a result, the desired marking action occurs and the sunken object can be readily located and recovered.

Detailed description of preferred embodiment

Figure 1:
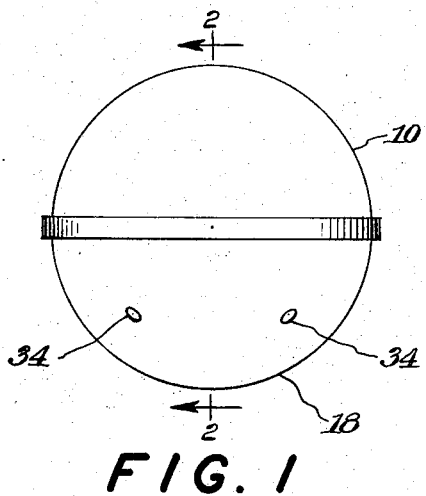
FIG. 1 is a side vief of our buoy.
Figure 2:
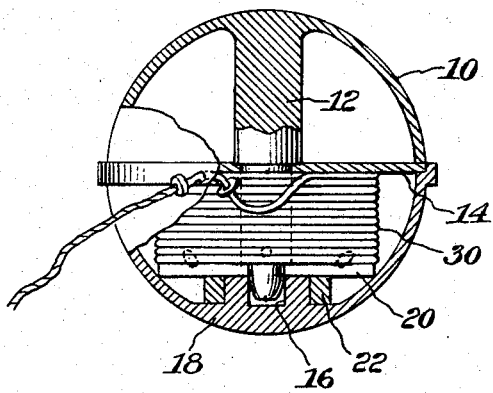
FIG. 2 is a view through 2—2 in FIG. 1.
Figure 3:
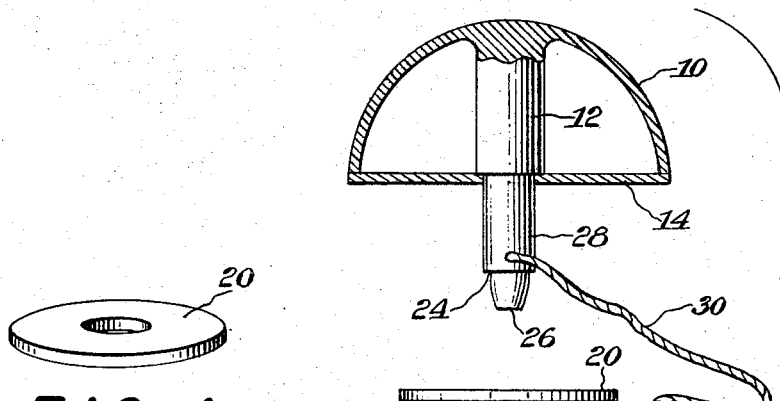
FIG. 3 is an exploded view of the parts of our buoy.
Figure 4:
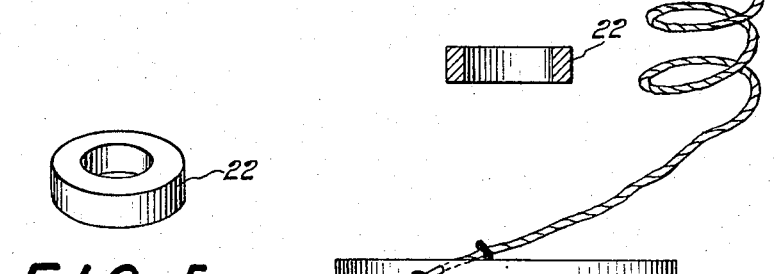
FIG. 4 is a view of a magnetic washer used in our invention.
Figure 5:
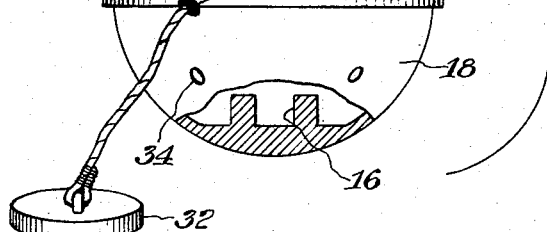
FIG. 5 is a view of a magnet used in our invention.

Referring now to FIGS. 1–5, a first upper plastic hollow hemisphere 10 has a spindle 12 extending axially downward through a flat plastic circular disc 14 which seals off the bottom of the hemisphere 10 (and thus converts it to a float) into a recess 16 in the bottom of a lower hollow hemisphere 18. A metal magnetic washer 20 fits over spindle 12 and is secured thereto at shoulder portion 24. A magnet ring 22 is secured to the periphery of recess whereby the tip 26 of the spindle can extend into the recess and washer 20 and magnet 22 are engaged by magnetic action. A portion 28 of spindle 12 serves as a storage spool with nylon cable 30 wrapped therearound. One end of cable 30 is secured to the spindle; the other end extends through the hemisphere 18 and is adapted to be secured to a nonfloating object 32. Hemisphere 18 has holes 34 therein.

When object 32 is submerged, water enters holes 34, creating increasing pressure with depth until buoyancy of top sections 10 overcomes magnetic coupling effect, releasing top section 10, which floats to the surface unwinding connecting cable 30, the lower end of which is still fastened to sunken object 32 to be retrieved.

This device can be used by sportsmen as well as being adaptable to certain commercial as well as military applications. For inland or relatively shallow waters, manufacture is comparatively inexpensive. With necessity, a larger version with connecting cord sufficiently strong, mere lifting of the sunken object could be achieved, in other applications scuba gear or grapnels would be indicated.

Having thus described our invention, we claim as new and desire to secure by Letters Patent:

1. A self-releasing marker buoy comprising:
   first and second hollow matable hemispheres, at least one of which has holes therein;
   means securing one of said hemispheres to a nonfloating object;
   cable means disposed within said one hemisphere and secured to the other hemisphere; and
   means magnetically coupling said hemispheres together whereby when said object sinks in water, water enters the coupled hemispheres through said holes whereby buoyancy of the other hemisphere overcomes the magnetic coupling effect and said other hemisphere rises to the surface of the water while remaining connected to said one hemisphere which in turn remains secured to said object whereby said object can be recovered.

2. A buoy as set forth in claim 1 wherein at least said other hemisphere will float in water.

3. A buoy as set forth in claim 2 wherein said magnetic coupling means includes a magnet secured to the interior of one of said hemispheres and a cooperating magnetized member secured to the interior of the other of said hemispheres.

4. A buoy as set forth in claim 3 wherein said cable means includes a storage spool secured to one of the hemispheres and a cable wound about said spool and adapted to be unwound when said hemispheres are separated.

5. A buoy as set forth in claim 4 wherein said means securing said one hemisphere to said object is a length of cable secured at one end to said object and at the other end to said cable means.

References Cited

UNITED STATES PATENTS 3,007,437  11/1961  Adair _____ 9—9 X
3,121,889  2/1964  Gentile _____ 9—9

TRYGVE M. BLIX, *Primary Examiner.*